(12) United States Patent
Kawamura et al.

(10) Patent No.: US 7,764,330 B2
(45) Date of Patent: Jul. 27, 2010

(54) LIQUID CRYSTAL DISPLAY DEVICE HAVING SPARE TRANSISTOR WITH NORMAL TRANSISTOR SEPARABLE FROM DATA SIGNAL LINE AND PIXEL ELECTRODE

(75) Inventors: Tetsuya Kawamura, Mobara (JP); Masashi Sato, Mobara (JP); Masanori Ookawa, Katsuura (JP); Kenta Kamoshida, Tokorozawa (JP); Nagatoshi Kurahashi, Ooamishirasato (JP); Hiroaki Iwato, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 135 days.

(21) Appl. No.: 11/737,776

(22) Filed: Apr. 20, 2007

(65) Prior Publication Data
US 2008/0036936 A1 Feb. 14, 2008

(30) Foreign Application Priority Data
Apr. 21, 2006 (JP) ............... 2006-118227

(51) Int. Cl.
G02F 1/136 (2006.01)
G02F 1/1333 (2006.01)
G02F 1/1343 (2006.01)
G02F 1/13 (2006.01)

(52) U.S. Cl. .............. 349/55; 349/48; 349/54; 349/192

(58) Field of Classification Search ........... 349/55, 349/48, 54, 192
See application file for complete search history.

(56) References Cited

U.S. PATENT DOCUMENTS

| 4,902,638 | A | * | 2/1990 | Muto ............ 438/4 |
| 5,392,143 | A | | 2/1995 | Akiyama et al. |
| 7,224,032 | B2 | | 5/2007 | Shiraki et al. |
| 2001/0028418 | A1 | | 10/2001 | Ozaki et al. |
| 2008/0024691 | A1 | * | 1/2008 | Okabe et al. ............ 349/54 |

FOREIGN PATENT DOCUMENTS

| CN | 1651998 | 2/2008 |
| JP | 05-341316 | 12/1993 |
| JP | 2002-182246 A | 6/2002 |

OTHER PUBLICATIONS

Okabe et al., U.S. Appl. No. 11/730,867.*

* cited by examiner

Primary Examiner—Andrew Schechter
Assistant Examiner—Michael Inadomi
(74) Attorney, Agent, or Firm—Antonelli, Terry, Stout & Kraus, LLP.

(57) ABSTRACT

A normal transistor CTFT connected to a data signal line DL and a pixel electrode PX and a spare transistor FTFT in a floating state are formed on a gate line GL. When an operational abnormality occurs in the normal transistor CTFT, the normal transistor CTFT is cut off from the data signal line DL and is cut off from the pixel electrode PX connected via a through hole TH by cutting lines CL. Thereafter, the spare transistor FTFT is connected to the data signal line DL and the pixel electrode PX by repair lines RL.

19 Claims, 8 Drawing Sheets

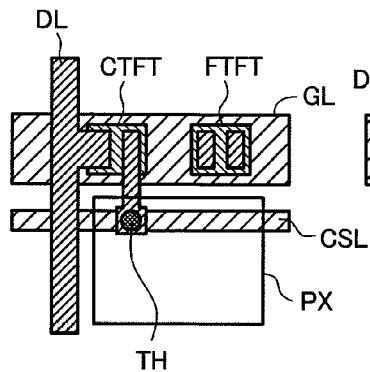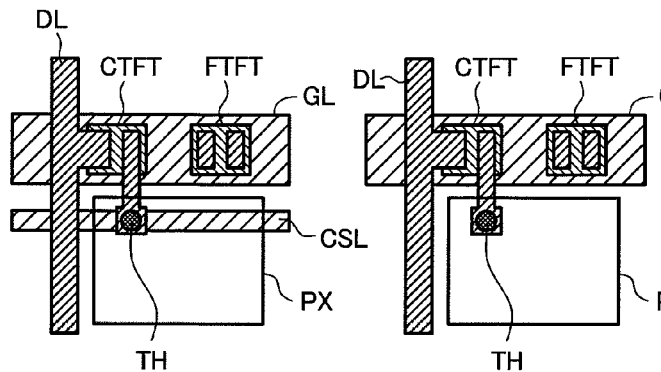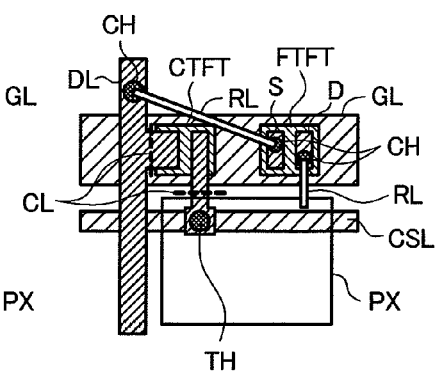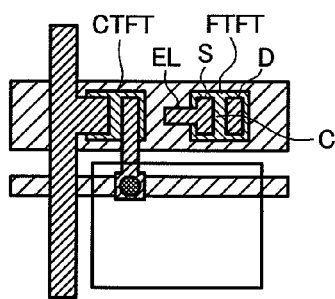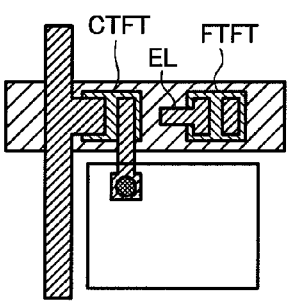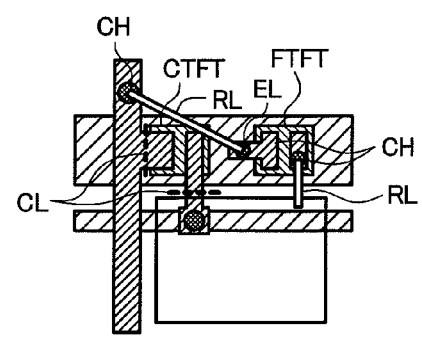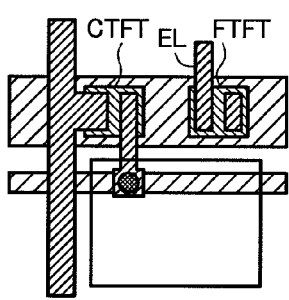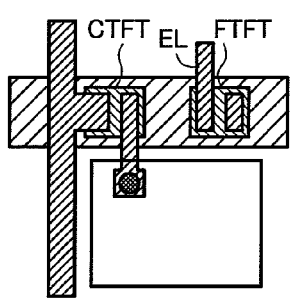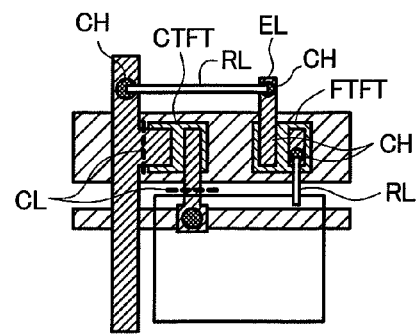

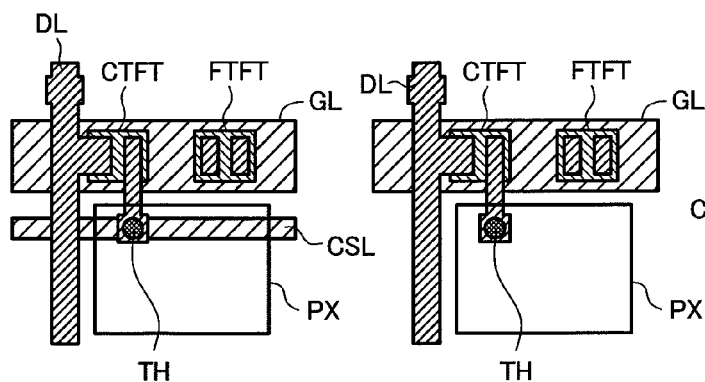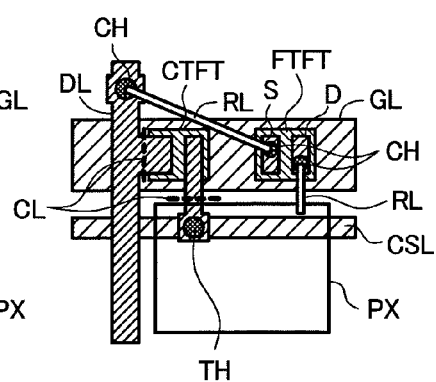
FIG. 16A  FIG. 16B  FIG. 16C
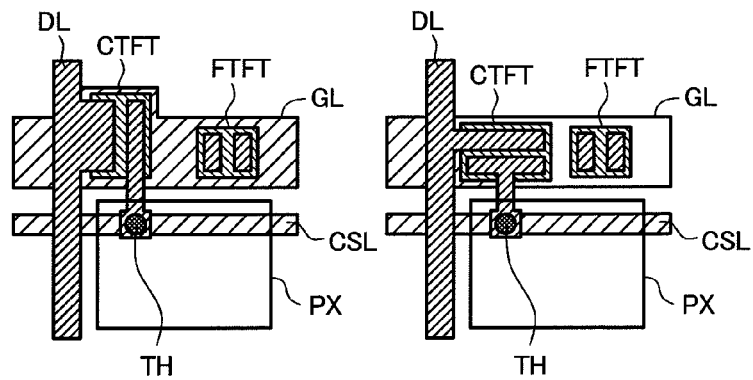
FIG. 17A  FIG. 17B
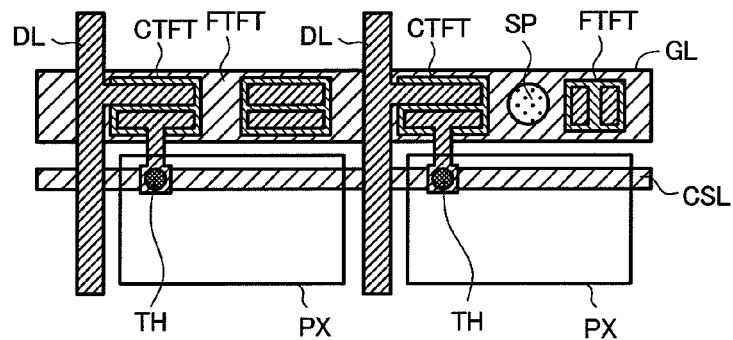
FIG. 18

LIQUID CRYSTAL DISPLAY DEVICE HAVING SPARE TRANSISTOR WITH NORMAL TRANSISTOR SEPARABLE FROM DATA SIGNAL LINE AND PIXEL ELECTRODE

CLAIM OF PRIORITY

The present application claims priority from Japanese application serial No. 2006-118227, filed on (Apr. 21, 2006), the content of which is hereby incorporated by reference into this application.

BACKGROUND OF THE INVENTION

1. Field of the Invention

The present invention relates to a thin-film transistor liquid crystal display device, and deals with abnormality in the operation of a thin-film transistor.

2. Description of the Related Art

A liquid crystal display element comprises a liquid crystal material interposed between two substrates that have been oriented, with the peripheral edges being sealed by a seal. The liquid crystal display element performs display as a result of the state of orientation of the liquid crystal material interposed between the two substrates being controlled. The techniques for controlling this state of orientation are various, but a technique is widely and commonly performed where the state of orientation of the liquid crystal material in a steady state is controlled by the orientation of the surfaces of the two substrates and where an electric field is applied to the liquid crystal material by an electrode disposed on at least one of the substrates to cause the liquid crystal material to change from its steady state.

In a thin-film transistor (TFT) liquid crystal display device, data signal lines that send data corresponding to a voltage level applied to the liquid crystal of each pixel and scan signal lines that control the writing of data signals to each pixel are wired in the vertical direction and the horizontal direction of a screen, and one or more transistors are connected to each of the pixels arranged in a matrix.

When an operation abnormality occurs in these transistors, a bright spot defect or a black spot defect occurs depending on the relationship between the content of the abnormality and the operation mode of the liquid crystal. There are various methods for repairing these defects, but it is difficult to repair a transistor whose operation has become abnormal, and black spot repair that abandons drive operation resulting from a transistor and wires a pixel electrode to another line and a method that wires a pixel electrode to another pixel electrode to perform the same display with two pixels and make the defect inconspicuous are common.

In this manner, when an abnormality in the operation of a transistor occurs, the abnormal transistor is cut off from the pixel electrode and, at the same time, the pixel electrode is connected to another line or an adjacent pixel electrode to make the defect inconspicuous.

Further, in JP-A-5-341316, connecting two transistors to one pixel and cutting off a transistor that has become abnormal is described.

Thus, it is an object of the present invention to provide a liquid crystal display device where operational abnormalities in thin-film transistors are eliminated.

When, in order to repair a defect in a display device resulting from an abnormality in the operation of a thin-film transistor, the pixel connected to the operationally abnormal transistor is cut off from the operationally abnormal transistor, connected to another line, and becomes a black spot, the pixel that has become a black spot continues to display black regardless of the screen that is to be originally displayed.

In a color liquid crystal display device, pixels having color filters of three or more color light up at the same time and display white, so that if a black spot in one color occurs, that one color does not light up in the white display state and ends up appearing as a complementary color of the color that does not light up. Particularly in uses such as a liquid crystal television where the pixel size is large, even a black spot defect ends up appearing as a colored spot defect in the white display.

Further, the method of cutting off a pixel connected to an operationally abnormal transistor from the operationally abnormal pixel and connecting the pixel to an adjacent pixel is effective when displaying white, but when red, green, and blue are displayed using a color filter of a single color, a phenomenon occurs where a pixel that is not supposed to light up ends up lighting up or a pixel that is supposed to light up ends up not lighting up, so it is difficult to say that the repair is infallible.

Moreover, the method of connecting two transistors to one pixel cannot be employed in large-screen high-definition products because parasitic capacitance between the gate lines and the data lines becomes large, the problem of signal delay occurs, and the brightness within the screen becomes non-uniform.

In this manner, even when operation of a thin-film transistor is abnormal, it is necessary to realize white color display that is uniform within the screen, single color display that is uniform within the screen, and brightness display that is uniform within the screen.

SUMMARY OF THE INVENTION

In the present invention, a spare transistor not connected to a data signal line and a pixel electrode is formed in addition to a normal transistor for driving a pixel. Then, at the stage when an abnormality has been discovered in the operation of the normal transistor for driving the pixel, this transistor is cut off from the data signal line and the pixel electrode, and the spare transistor is connected to the data signal line and the pixel electrode.

According to the present invention, in regard to a spot defect resulting from an abnormality in the operation of a thin-film transistor, the thin-film transistor whose operation is abnormal is cut off from the data signal line and the pixel electrode, and the data signal line and the pixel electrode are reconnected to the spare thin-film transistor, so that display where there are no color shifts resulting from signal delay and black spots between white display and single color display can be performed.

Further, because it is possible to repair defects in the final step of a thin-film transistor, it becomes possible to consolidate the inspection/repair step in the final step, and simplification of the process can be realized.

BRIEF DESCRIPTION OF THE DRAWINGS

FIGS. 1A to 1C are configural diagrams of a basic first embodiment of a pixel portion in a liquid crystal display device pertaining to the present invention;

FIGS. 2A to 2C are configural diagrams of a second embodiment of the pixel portion;

FIGS. 3A to 3C are configural diagrams of a third embodiment of the pixel portion;

FIGS. 16A to 16C are configural diagrams of a sixteenth embodiment of the pixel portion;

FIGS. 17A and 17B are configural diagrams of a seventeenth embodiment of the pixel portion;

FIG. 18 is a configural diagram of an eighteenth embodiment of the pixel portion;

DETAILED DESCRIPTION OF THE INVENTION

Figure 4A:
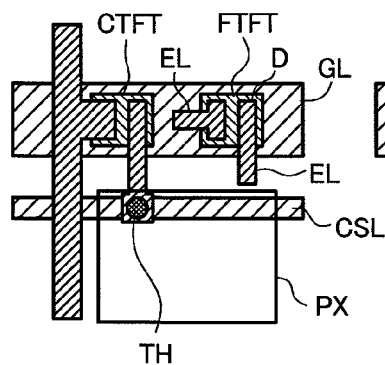
FIGS. 4A to 4C are configural diagrams of a fourth embodiment of the pixel portion.

Embodiments of the present invention will be described below using the drawings.

First Embodiment

FIGS. 1A to 1C are basic configural diagrams of a pixel portion in a liquid crystal display device including pixel portions arranged in a matrix. FIG. 1A is a configural diagram showing when there is no operational abnormality in a normal thin-film transistor, FIG. 1B is a configural diagram from which a holding capacity line CSL has been omitted, and FIG. 1C is a configural diagram corresponding to FIG. 1A after an operational abnormality has been repaired.

Turning now to FIGS. 1A to 1C, a normal transistor CTFT that is connected to a data signal line DL and a pixel electrode PX and a spare transistor FTFT in a floating state where it is not connected to the data signal line DL and the pixel electrode PX are formed on a gate line GL.

When an operational abnormality occurs in the normal transistor CTFT shown in FIGS. 1A and 1B, the operationally abnormal transistor CTFT is cut off from the data signal line DL and is cut off from the pixel electrode PX to which it is connected via a through hole TH by cutting lines CL shown in FIG. 1C.

Moreover, as shown in FIG. 1C, a contact hole CH is formed in a drain electrode D and a source electrode S of the spare transistor FTFT and in the data signal line DL, and thereafter the source electrode S of the spare transistor FTFT is connected to the data signal line DL and the drain electrode D of the spare transistor FTFT is connected to the pixel electrode PX by repair lines RL. The repair lines RL may be connected by any method as long as it is one that can locally form a conductor. For example, the repair lines RL can be connected without problem by an existing technique such as laser CVD.

It will be noted that, in the present embodiment, because the pixel electrode PX is present on the uppermost layer, as shown in FIG. 1C, a contact hole is not formed in the pixel electrode PX portion. Further, when some kind of insulating film is present on the pixel electrode PX portion, it goes without saying that the insulating film is removed to connect the pixel electrode PX to the spare transistor FTFT.

Second Embodiment

FIGS. 2A to 2C are configural diagrams of the pixel portion of the present embodiment. What is different from the first embodiment shown in FIGS. 1A to 1C is that a protrusion or leader line EL is formed in the opposite direction of a channel C from the source electrode S of the spare transistor FTFT. FIGS. 2A, 2B, and 2C correspond to FIGS. 1A, 1B, and 1C, and description of the same reference letters will be omitted.

Turning now to FIGS. 2A to 2C, when the contact hole CH and the repair line RL have been wrongly formed on the portion directly above the channel C when the spare transistor FTFT is to be connected to the data signal line DL and the pixel electrode PX, there is concern for operational abnormality in the spare transistor FTFT. Further, when a heating process such as laser CVD is used in the formation of the contact hole and in the formation of the conductor, there is similarly concern for adverse effects on the spare transistor.

For that reason, it is desirable to dispose, to the extent that it is possible, some kind of leader portion and form the contact hole CH and connect the repair line RL at a portion away from the spare transistor FTFT.

Consequently, by forming the leader line EL from the source electrode S of the spare transistor FTFT, adverse effects resulting from heating and operational abnormality in the spare transistor FTFT are alleviated.

In the present embodiment, the number and shape of the leader line EL may be determined in consideration of the ease of repairing the pixel portion and side effects of heat and the like, and it is not invariably necessary for the leader line EL to have the shape shown in FIGS. 2A to 2C.

Third Embodiment

FIGS. 3A to 3C are configural diagrams of the pixel portion of the present embodiment. What is different from the second embodiment shown in FIGS. 2A to 2C is that the leader line EL for repair connection is led out as far as the outside of the gate line GL. FIGS. 3A, 3B, and 3C correspond to FIGS. 2A, 2B, and 2C, and description of the same reference letters will be omitted.

Turning now to FIGS. 3A to 3C, a heat process such as laser CVD is used in the formation of the contact holes CH and in the connection of the repair lines RL when the spare transistor FTFT is to be connected to the data signal line DL and the pixel electrode PX. For that reason, when the leader line EL is disposed on the gate line GL and the contact hole CH is formed as in the second embodiment, there is the potential for the insulating film between the leader line EL and the gate line GL to be destroyed by heat. Thus, in the present embodiment, the leader line is led out as far as the outside of the gate line GL from the spare transistor FTFT, so that the work of connection can be implemented without the concern of destroying the base insulating film at the leader portion.

In the present embodiment, just one leader line EL is disposed as far as the outside of the gate line GL from the spare transistor FTFT, but the number of the leader line EL may be determined in consideration of achieving a balance between the ease of repairing the pixel portion and side effects of heat and the like, and may be one or two.

Fourth Embodiment

Figure 4B:
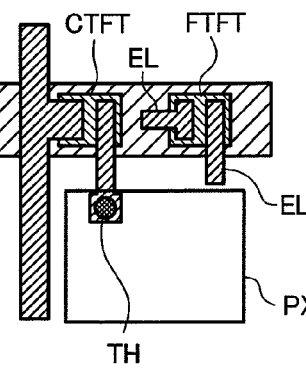
Figure 4C:
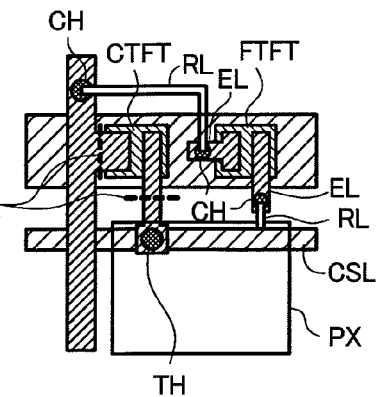

FIGS. 4A to 4C are configural diagrams of the pixel portion of the present embodiment. What is different from the second and third embodiments shown in FIGS. 2A to 2C and FIGS. 3A to 3C is that it is ensured that leader lines EL do not intersect the pixel electrode PX and the holding capacity line CSL. FIGS. 4A, 4B, and 4C correspond to FIGS. 2A, 2B, 2C and FIGS. 3A, 3B, and 3C, and description of the same reference letters will be omitted.

Turning now to FIGS. 4A to 4C, when a leader line EL from the drain electrode D of the spare transistor FTFT planarly intersects the pixel electrode PX, parasitic capacitance between the pixel electrode PX (or the drain electrode D) and the gate line GL becomes larger, which causes a problem in the uniformity of display within the screen. Thus, in the present embodiment, when the leader line EL is formed in the direction of the pixel electrode PX, the leader line EL does not planarly intersect the pixel electrode PX. Similarly, the leader line EL also does not planarly intersect the holding capacity line CSL.

Fifth Embodiment

Figure 5A:
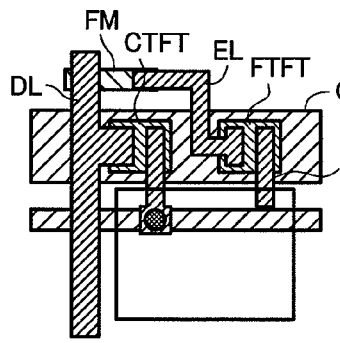
FIGS. 5A to 5C are configural diagrams of a fifth embodiment of the pixel portion.
Figure 5B:
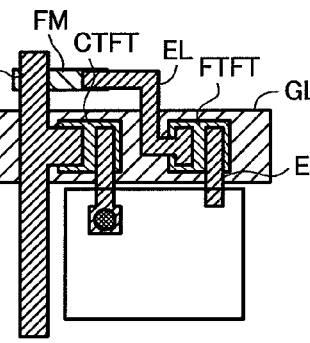
Figure 5C:
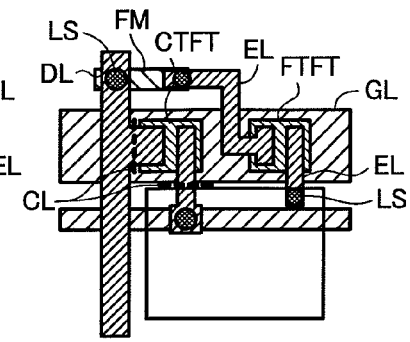

FIGS. 5A to 5C are configural diagrams of the pixel portion of the present embodiment. What is different from the embodiments heretofore is that the leader lines EL from the spare transistor FTFT planarly intersect both the data line DL and the pixel electrode PX, but they are placed in a floating state where they are not connected in terms of direct current. FIGS. 5A, 5B, and 5C correspond to A, B, and C of the heretofore figures, and description of the same reference letters will be omitted.

Turning now to FIGS. 5A to 5C, a floating metal FM is in the same layer as the gate line GL and planarly intersects the data signal line DL via an insulating layer. The leader line EL from the spare transistor FTFT and the data signal line DL are in the same layer and overlap the floating metal FM via the insulating film. As shown in FIG. 5C, this overlapping portion is capable of being connected by laser spots LS that have been heat-welded utilizing a laser or the like, so that connection of the source electrode S of the spare transistor FTFT and the data signal line DL is easy.

In the present embodiment, because the data signal line DL and the leader line EL are capacity-coupled at the two places of the planarly intersecting portions of the floating metal FM, the data signal line DL and the gate line GL are as a result capacity-coupled, so the coupling capacitance between the gate line GL and the data signal line DL becomes larger in comparison to the first embodiment. However, the capacity-coupling of the gate line and the data signal line can be made smaller in comparison to when the data signal line and the spare transistor are always directly connected as has conventionally been the case.

Further, in the present embodiment, the leader line EL from the spare transistor FTFT is not connected in terms of direct current while planarly intersecting the pixel electrode PX. In regard to this also, there is the advantage that the spare transistor FTFT and the pixel electrode PX can be connected by the laser spot LS just by heat welding with a laser or the like. In regard to this also, although the capacity-coupling value of the pixel electrode PX and the gate line GL becomes larger in comparison to the first embodiment, the coupling capacitance of the pixel electrode and the gate line is small in comparison to conventional coupling capacitance.

In the present embodiment, the leader lines EL from the spare transistor FTFT planarly intersect both the data signal line DL and the pixel electrode PX, but they may also be configured such that either one does not planarly intersect.

Sixth Embodiment

Figure 6A:
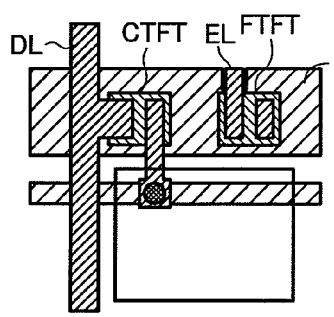
FIGS. 6A to 6C are configural diagrams of a sixth embodiment of the pixel portion.
Figure 6B:
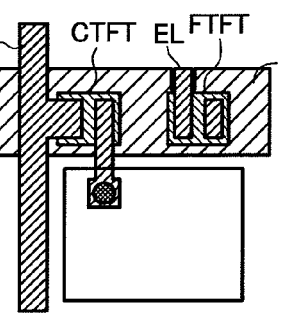
Figure 6C:
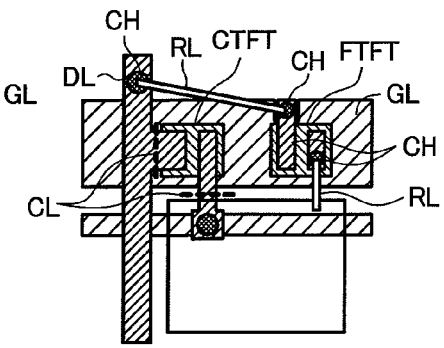

FIGS. 6A to 6C are configural diagrams of the pixel portion of the present embodiment. What is different from the third embodiment shown in FIGS. 3A to 3C is that a cutout portion is disposed in the gate line GL. FIGS. 6A, 6B, and 6C correspond to FIGS. 3A, 3B, and 3C, and description of the same reference letters will be omitted.

Turning now to FIGS. 6A to 6C, a cutout portion is disposed in the gate line GL in order to allow the leader line EL from the spare transistor FTFT to project from the gate line GL. When a cutout portion is not disposed in the gate line GL and the leader line EL is allowed to project from the gate line GL as in the third embodiment, there is the potential for the aperture ratio of the pixel portion to drop in order to avoid interference with a pixel electrode and the like on the upper side. Thus, in the present embodiment, by disposing a cutout just in the portion of the gate line GL where the leader line EL from the spare transistor FTFT is disposed, a drop in the aperture ratio can be controlled and an increase in the resistance of the gate line can be kept to a minimum.

Seventh Embodiment

Figure 7A:
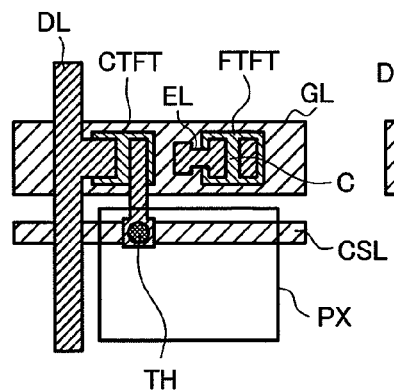
FIGS. 7A to 7C are configural diagrams of a seventh embodiment of the pixel portion.
Figure 7B:
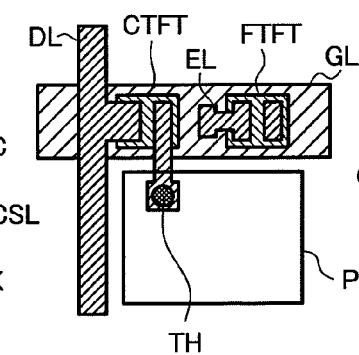
Figure 7C:
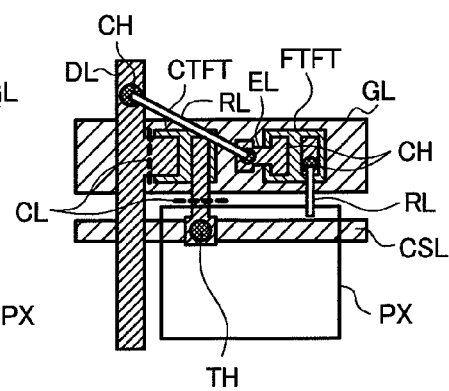

FIGS. 7A to 7C are configural diagrams of the pixel portion of the present embodiment. What is different from the second embodiment shown in FIGS. 2A to 2C is that part of the leader line EL is fattened. FIGS. 7A, 7B, and 7C correspond to FIGS. 2A, 2B, and 2C, and description of the same reference letters will be omitted.

Turning now to FIGS. 7A to 7C, part of the leader line EL from the spare transistor FTFT is fattened so that when it is to be connected to the data line DL, the work of forming the contact holes CH and connecting the repair line RL is made easy. It will be noted that when the width of the leader line EL from the spare transistor FTFT is fattened overall, the intersection area with the gate line GL increases and the concern for the occurrence of a short-circuit fault between the leader line EL and the gate line GL rises because of gate insulating film abnormality and the like. Further, when the leader line connecting to the pixel electrode PX is fattened, the intersection area between the fattened leader line and the gate line GL increases, the capacity-coupling of the gate line GL and the pixel electrode PX becomes larger, and there is the potential for it to become difficult to make the brightness of a repaired pixel portion the same as the brightness of an unrepaired pixel portion. Consequently, fattening just the part used in connection rather than the entire leader line is effective for improving repair workability and casting aside other matters of concern.

Eighth Embodiment

Figure 8A:
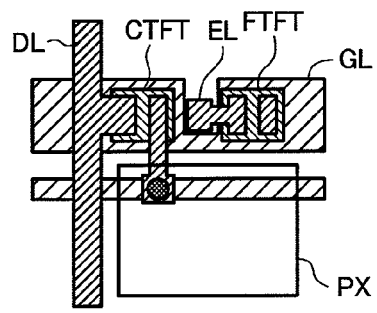
FIGS. 8A and 8B are configural diagrams of an eighth embodiment of the pixel portion.
Figure 8B:
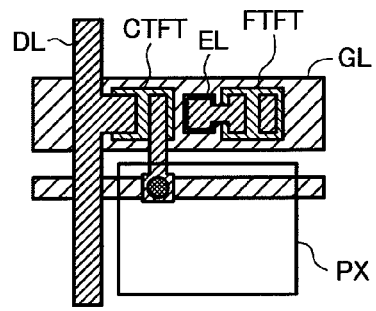

FIGS. 8A and 8B are configural diagrams of the pixel portion of the present embodiment. What is different from the seventh embodiment shown in FIGS. 7A to 7C is that a cutout portion is formed in the gate line GL around the fattened portion of the leader line EL. FIG. 8A shows an open cutout portion, and FIG. 8B shows a cutout portion in the middle of the gate line GL.

Turning now to FIGS. 8A and 8B, the cutout portion in the gate line GL is disposed between the normal transistor CTFT and the spare transistor FTFT, and the leader line EL from the spare transistor FTFT is led out to the cutout portion. In this manner, because the normal transistor CTFT and the spare transistor FTFT are distanced from each other, the potential for both transistors to become bad at the same time due to foreign matter or the like is low and redundancy is high.

Ninth Embodiment

Figure 9A:
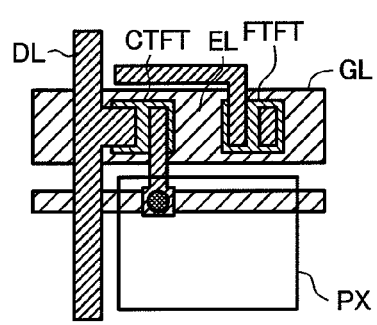
FIGS. 9A and 9B are configural diagrams of a ninth embodiment of the pixel portion.
Figure 9B:
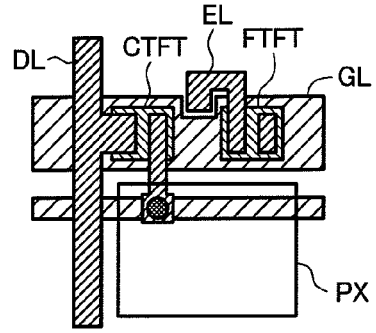

FIGS. 9A and 9B are configural diagrams of the pixel portion of the present embodiment. What is different from the fifth embodiment shown in FIGS. 5A to 5C is that the leader line EL projects from the gate line GL parallel to the source electrode S of the spare transistor FTFT. FIG. 9A shows a case where the leader line EL is bent, and FIG. 9B shows a case where the terminal end of the bent leader line EL is disposed in a cutout portion of the gate line GL.

Turning now to FIGS. 9A and 9B, until the leader line EL from the spare transistor FTFT projects from the gate line GL, the leader line EL is led out an angle close to orthogonal to the direction of the gate line GL (e.g., about 90°±45°), and thereafter the leader line EL is bent in the direction of the data signal line DL.

In the present embodiment, the area of intersection between the gate line GL and the leader line EL is small in comparison to the fifth embodiment, so the rate of the occurrence of a short-circuit fault between the spare transistor FTFT and the gate line GL can be reduced.

In FIG. 9A, during the work of repair, the distance of the conductor to be formed as a film can be shortened and repair efficiency can be improved.

In FIG. 9B, the line width of the terminal end of the leader line EL is fattened and the terminal end is disposed in the cutout portion in part of the gate line GL, so that in comparison to the eighth embodiment, a rise in the resistance of the gate line GL can be controlled, the rate of occurrence of a short-circuit fault between the terminal end of the leader line EL and the gate line GL can be kept to a minimum, and a line width-enlarged region can be disposed in the leader line EL.

Tenth Embodiment

Figure 10:
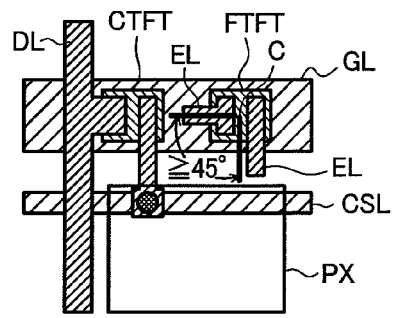
FIG. 10 is a configural diagram of a tenth embodiment of the pixel portion.

FIG. 10 is a configural diagram of the pixel portion of the present embodiment. The pixel portion has the same configuration as that of the fourth embodiment shown in FIGS. 4A to 4C, but here the angle between the two leader lines is 45° or greater. The reference letters in FIG. 10 are the same as those described heretofore.

Turning now to FIG. 10, when the two leader lines El are disposed from the spare transistor FTFT, the angle that the two distal ends of the leader lines EL form with the center of the channel C of the spare transistor FTFT serving as the apex is configured to be 45° or greater. When the leader lines are led out in the same direction, the leader lines become proximate to each other, so that during repair work to connect conductors to the proximate leader lines, there is the potential to cause a short-circuit fault. In order to prevent this, it is necessary in the present embodiment to pull apart the distal ends of the leader lines.

Eleventh Embodiment

Figure 11A:
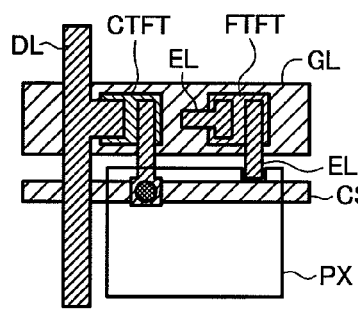
FIGS. 11A to 11C are configural diagrams of an eleventh embodiment of the pixel portion.
Figure 11B:
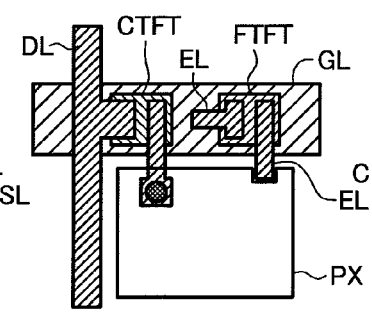
Figure 11C:
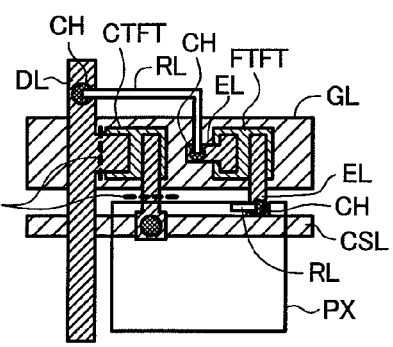

FIGS. 11A to 11C are configural diagrams of the pixel portion of the present embodiment. What is different from the fourth embodiment shown in FIGS. 4A to 4C is that a cutout portion is disposed in part of the pixel electrode PX. FIGS. 11A, 11B, and 11C correspond to FIGS. 4A, 4B, and 4C, and description of the same reference letters will be omitted.

Turning now to FIGS. 11A to 11C, a cutout portion is disposed in the pixel electrode PX in order to prevent the leader line EL from the spare transistor FTFT from intersecting the pixel electrode PX. By disposing a cutout portion in part of the pixel electrode PX, a drop in the aperture ratio of the pixel portion can be kept to a minimum, and parasitic capacitance between the gate line GL and the pixel electrode PX can be prevented from increasing.

Twelfth Embodiment

Figure 12:
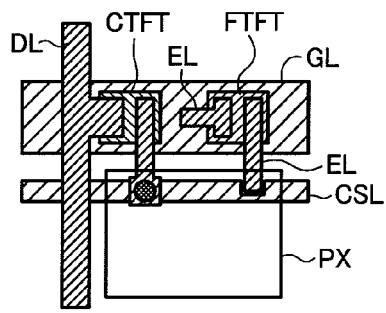
FIG. 12 is a configural diagram of a twelfth embodiment of the pixel portion.

FIG. 12 is a configural diagram of the pixel portion of the present embodiment. What is different from the fourth embodiment shown in FIGS. 4A to 4C is that a cutout portion is disposed in part of the holding capacity line CSL. The reference letters in FIG. 12 are the same as those described heretofore.

Turning now to FIG. 12, the holding capacity line CSL is cut out in order to prevent the holding capacity line CSL from intersecting the leader line EL from the spare transistor FTFT. By cutting out the holding capacity line CSL, a drop in the aperture ratio is kept to a minimum and parasitic capacitance between the gate line GL and the holding capacity line CSL is prevented from increasing. It will be noted that although part of the line width of the holding capacity line CSL is cut out, the same effects can be obtained even if the holding capacity line CSL is bypassed while keeping the same line width.

Thirteenth Embodiment

Figure 13A:
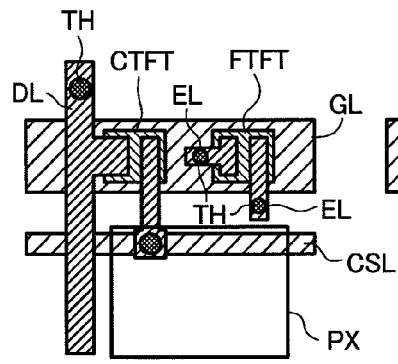
FIGS. 13A to 13C are configural diagrams of a thirteenth embodiment of the pixel portion.
Figure 13B:
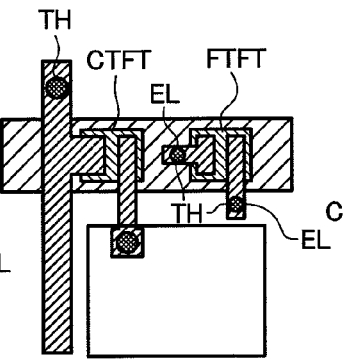
Figure 13C:
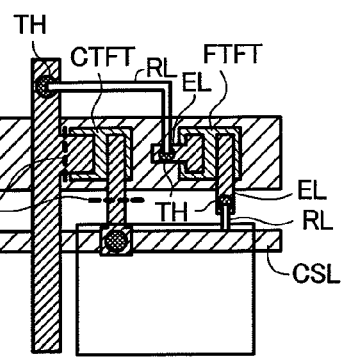

FIGS. 13A to 13C are configural diagrams of the pixel portion of the present embodiment. What is different from the fourth embodiment shown in FIGS. 4A to 4C is that through holes TH are previously formed instead of the contact holes CH formed during the work of repair. FIGS. 13A, 13B, and 13C correspond to FIGS. 4A, 4B, and 4C, and description of the same reference letters will be omitted.

Turning now to FIGS. 13A to 13C, through holes TH are disposed in regions where the insulating film has been removed in the distal ends of the leader lines EL of the spare transistor FTFT and the data signal line DL. When the spare transistor FTFT is connected to the data signal line DL and the pixel electrode PX, it becomes unnecessary to form contact holes during the work of connection as in the fourth embodiment, so that in the present embodiment, the connection work can be done efficiently.

Fourteenth Embodiment

Figure 14A:
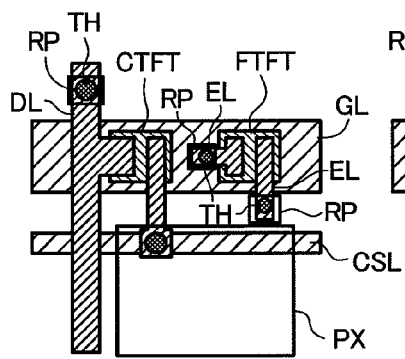
FIGS. 14A to 14C are configural diagrams of a fourteenth embodiment of the pixel portion.
Figure 14B:
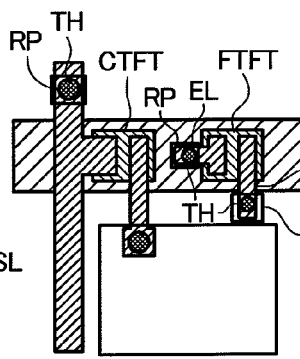
Figure 14C:
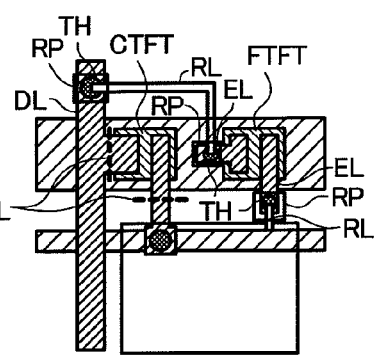

FIGS. 14A to 14C are configural diagrams of the pixel portion of the present embodiment. What is different from the thirteenth embodiment shown in FIGS. 13A to 13C is that conductor regions RP are disposed on the through holes TH. FIGS. 14A, 14B, and 14C correspond to FIGS. 13A, 13B, and 13C, and description of the same reference letters will be omitted.

Turning now to FIGS. 14A to 14C, connection-use conductor regions RP are disposed on the through holes TH and in the same layer as the pixel electrode PX by the material of the pixel electrode PX. By disposing connection regions by conductors on the through holes TH, the necessary connection regions can be ensured regardless of the size of the through holes TH and the line width of the source and drain metal of the leader lines EL.

Further, in comparison to the thirteenth embodiment, at the time of pattern formation of the pixel electrode PX, in the present embodiment, the data signal line DL under the conductor region RP and the leader line EL of the spare transistor FTFT do not come into contact with the etching liquid of the pixel electrode PX, so the material of the data signal line DL and the pixel electrode PX and the etching liquid thereof can be selected without having to worry about damage to the data signal line DL and the leader lines EL when forming the pixel electrode PX.

It will be noted that, in the present embodiment, although the conductor regions RP are formed in the same layer and using the same material as the pixel electrode PX, the layer and material forming the conductor regions RP may be a layer higher than the data signal line DL and the source and drain electrodes of the spare transistor FTFT, and it is not invariably necessary for the conductor regions RP to be formed in the same layer and with the same material as the pixel electrode PX.

Fifteenth Embodiment

Figure 15A:
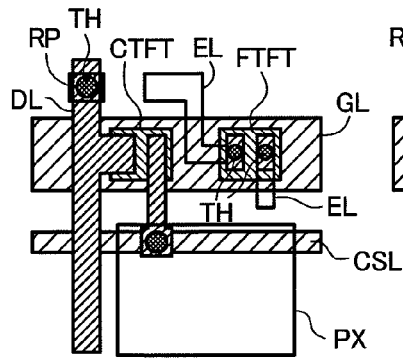
FIGS. 15A to 15C are configural diagrams of a fifteenth embodiment of the pixel portion.
Figure 15B:
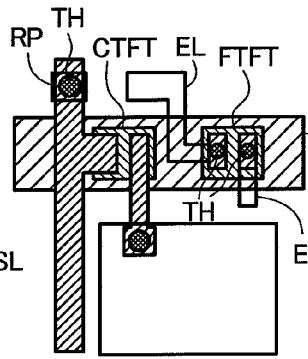
Figure 15C:
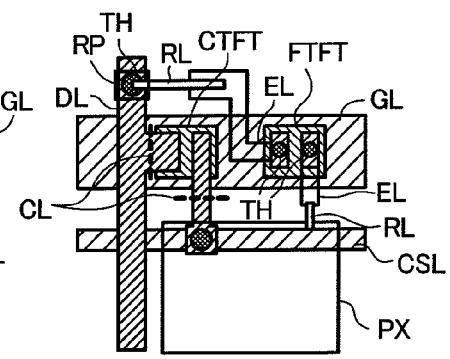

FIGS. 15A to 15C are configural diagrams of the pixel portion of the present embodiment. What is different from the fourteenth embodiment shown in FIGS. 14A to 14C is that the leader lines EL from the spare transistor FTFT are formed by the material of the pixel electrode PX. FIGS. 15A, 15B, and 15C correspond to FIGS. 13A, 13B, and 13C, and description of the same reference letters will be omitted.

Turning now to FIGS. 15A to 15C, because the leader lines EL are led out from the source and drain metals of the spare transistor FTFT via the through holes TH, the area in which the source and drain metals intersect the gate line GL can be reduced. Because there are two layers—a gate insulating film and an insulating film thereabove—between the gate line GL and the leader lines EL formed by the material of the pixel electrode PX, the potential for the occurrence of a short-circuit fault between the leader lines EL and the gate line GL can be lowered.

In the present embodiment, the leader lines EL are formed in the same layer and with the same material as the pixel electrode PX, but it suffices for the material to be a conductor material of a higher layer than the pixel electrode PX. Further, in the present embodiment, the through holes TH and the leader lines EL resulting from the material of the pixel electrode PX are disposed in both the data signal line DL and the spare transistor FTFT, but it is not invariably necessary for these to be disposed in both at the same time and they may also be disposed just in the data signal line DL or just each of the leader lines EL of the spare transistor FTFT.

Sixteenth Embodiment

FIGS. 16A to 16C are configural diagrams of the pixel portion of the present embodiment. What is different from the first embodiment shown in FIGS. 1A to 1C is that the line width of part of the gate signal line DL is fattened. FIGS. 16A, 16B, and 16C correspond to FIGS. 1A, 1B, and 1C, and description of the same reference letters will be omitted.

Turning now to FIGS. 16A to 16C, the line width of part of the data signal line DL that does not intersect the gate line GL is fattened in order to make it easier to connect the spare transistor FTFT. When the data signal line DL is narrow, a sufficient contact area with the spare transistor FTFT cannot be obtained and there is the potential to cause line breakage or the like during connection work to form the contact holes CH.

Consequently, when a region is disposed where the line width of the portion of the data signal line DL that does not intersect the gate line GL is fattened, the connection work can be performed without these concerns.

Seventeenth Embodiment

FIGS. 17A and 17B are configural diagrams of the pixel portion of the present embodiment. What is different from the embodiments heretofore is that the size of the spare transistor FTFT is smaller than the size of the normal transistor CTFT. FIG. 17A shows an example where the channel C of the normal transistor CTFT is vertical, and FIG. 17B shows an example where the channel C of the normal transistor CTFT is horizontal. The reference letters in FIGS. 17A and 17B are the same as those described heretofore.

Turning now to FIGS. 17A and 17B, the channel width size of the spare transistor FTFT is made smaller than that of the normal transistor CTFT. Ordinarily a normal transistor CTFT and a spare transistor FTFT having the same size and the same performance must be prepared, but even when a transistor with a small channel width dimension is installed as in the present embodiment, assuming a display that becomes a black display without voltage application, signals from gray to black where the voltage of the data signal line DL is low can be accurately transmitted to the pixel electrode PX even with a transistor whose channel width dimension is small. However, in a white screen display where the applied voltage is high, just pixels that have been repaired become gray, but in comparison to when the pixels become completely black without repairing, in the present embodiment, the pixels can become gray and made inconspicuous, which is particularly effective in a compact high-definition liquid crystal display device where the size of the individual pixels is small.

Eighteenth Embodiment

FIG. 18 is a configural diagram of the pixel portion of the present embodiment. What is different from the embodiments heretofore is that a cell gap spacer SP is disposed in the pixel portion. The configuration other than this is the same as what has been described heretofore.

Turning now to FIG. 18, a cell gap spacer SP is disposed which maintains the distance between the TFT substrate on which the transistors CTFT and FTFT are formed and an opposing substrate that opposes this TFT substrate. The dimension of the channel width of the spare transistor FTFT in a pixel portion where this cell gap spacer SP is disposed is made smaller in comparison to the spare transistor FTFT in a pixel portion where the cell gap spacer SP is not disposed.

A liquid crystal display device has cell gap spacers that maintain the distance between the TFT substrate and the opposing substrate, but sometimes these are arranged in specific regions of specific pixel portions by photolithography or the like. At this time, when a spare transistor of the same size as the normal transistor is formed in a position where a cell gap spacer is disposed, sometimes there is difficulty in controlling the arrangement of the spacers. In order to avoid this, in a pixel portion where a spacer is disposed, the spare transistor is made smaller to avoid interference in terms of arrangement with the spacer.

Nineteenth Embodiment

Figure 19:
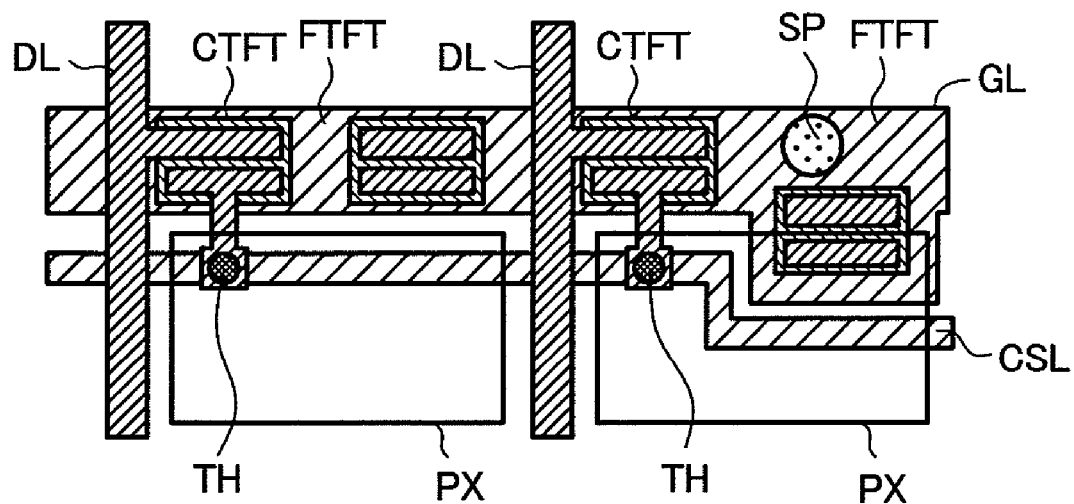
FIG. 19 is a configural diagram of a nineteenth embodiment of the pixel portion.

FIG. 19 is a configural diagram of the pixel portion of the present embodiment. What is different from the eighteenth embodiment shown in FIG. 18 is that the position of the spare transistor FTFT is changed between a pixel portion where the cell gap spacer SP is disposed and a pixel portion where the cell gap spacer SP is not disposed. The configuration other than this is the same as that of the eighteenth embodiment.

Turning now to FIG. 19, in a pixel portion where the cell gap spacer SP is disposed, the aperture ratio drops, but the arrangement of the spare transistor FTFT and the arrangement of the cell gap spacer SP do not interfere with each other. In the present embodiment, this is particularly effective in a large-screen low-resolution product where the pixel size is large.

Twentieth Embodiment

Figure 20:
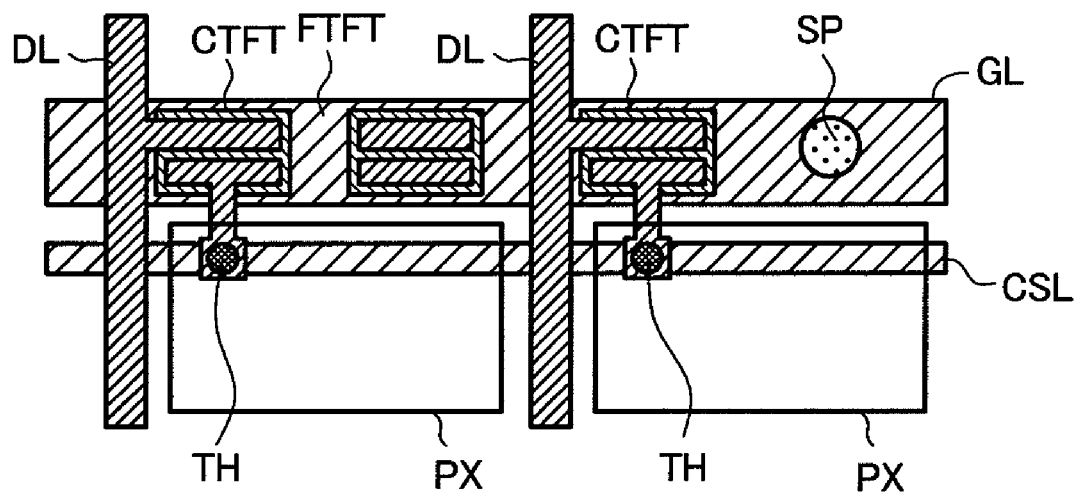
FIG. 20 is a configural diagram of a twentieth embodiment of the pixel portion.

FIG. 20 is a configural diagram of the pixel portion of the present embodiment. What is different from the eighteenth embodiment shown in FIG. 18 is that a spare transistor is not disposed just in the pixel portion where the cell gap spacer SP is disposed. The configuration other than this is the same as that of the eighteenth embodiment.

Turning now to FIG. 20, here it does not matter whether the size of the spare transistor FTFT disposed in the pixel portion is the same as or different from the size of the normal transistor CTFT. In the present embodiment, it goes without saying that interference in terms of the arrangements of the cell gap spacer SP and the spare transistor FTFT is avoided. It will be noted that when the normal transistor CTFT in a pixel portion where a spare transistor is not disposed is abnormal, the adjacent spare transistor FTFT can be utilized.

Twenty-First Embodiment

Figure 21:
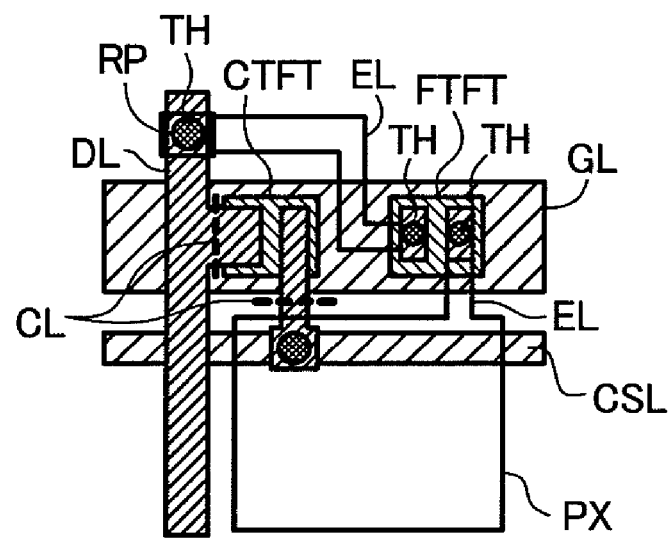
FIG. 21 is a configural diagram of a twenty-first embodiment of the pixel portion.

FIG. 21 is a configural diagram of the pixel portion of the present embodiment. What is different from the embodiments heretofore is that FIG. 21 is a configural diagram when an abnormality in the normal transistor CTFT has been discovered before forming the pixel electrode PX. The reference letters in FIG. 21 are the same as those in the embodiments described heretofore.

Turning now to FIG. 21, when an abnormality in the normal transistor CTFT has been discovered before forming the pixel electrode PX, the pixel electrode PX is worked to form repair lines RL with the same material as the pixel electrode PX when forming the pixel electrode PX.

Here, by pixel electrode PX working, an etching resist for the conductors RL may be directly drawn before etching the pixel electrode PX. Further, for example, an ITO film that has been formed in a non-crystalline state and becomes the pixel electrode PX waiting to be etched may be heated to crystallize the region where the repair lines RL are to be formed and prevent etching of this region.

In connecting the repair lines RL and the spare transistor FTFT, through holes TH may be formed beforehand in the insulating film on the source and drain film or may be heat-welded after formation of the repair lines RL. In the present embodiment, efficient repair is possible without the need to form new conductors for connecting the spare transistor FTFT and the data signal line DL.

Twenty-Second Embodiment

Figure 22:
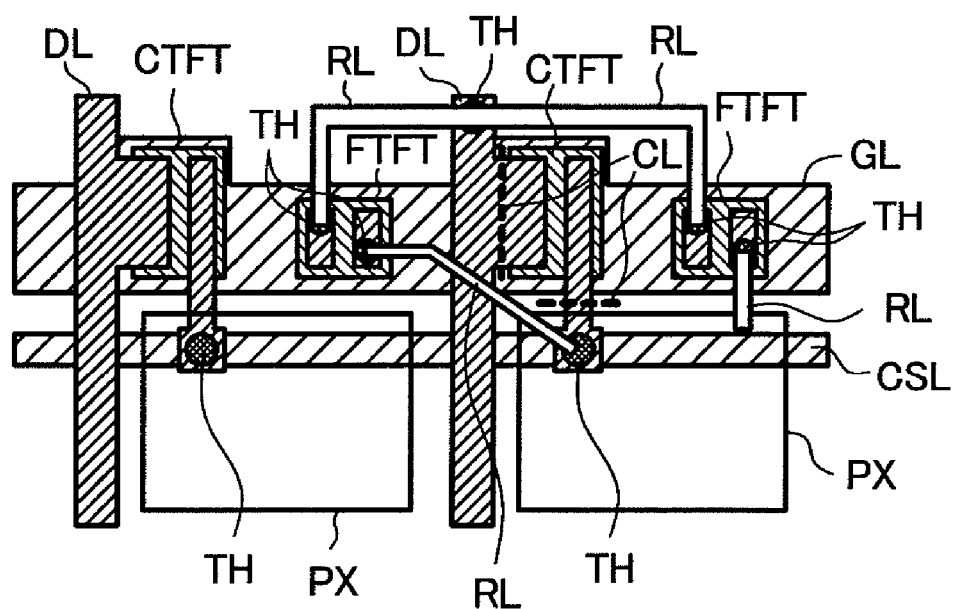
FIG. 22 is a configural diagram of a twenty-second embodiment of the pixel portion.

FIG. 22 is a configural diagram of the pixel portion of the present embodiment. What is different from the embodiments heretofore is that two spare transistors FTFT whose channel dimension is small are connected to one pixel portion and repaired. The reference letters in FIG. 22 are the same as those in the embodiments described heretofore.

Turning now to FIG. 22, when the channel dimension of the spare transistors FTFT is small, adjacent plural (two or more) spare transistors FTFT are connected and repaired. A sufficient charge can be supplied to the pixel electrode PX while reducing the size of the spare transistors FTFT.

In the preceding embodiments, a thin-film transistor liquid crystal display device where the holding capacity line CSL was independent of the gate line GL was described, but the salient point of the present invention is disposing a spare transistor in each pixel portion of a TFT liquid crystal display device, and the present invention is applicable to all TFT liquid crystal display devices.

What is claimed is:

1. A liquid crystal display device including pixel portions arranged in a matrix, wherein a normal transistor, connected to both a data signal line and to a pixel electrode, and a spare transistor, that is not connected to both the data signal line and the pixel electrode, are disposed in each of the pixel portions, wherein the liquid crystal display device is configured so that, upon detection that the normal transistor is operating abnormally, the normal transistor can be disconnected from the data signal line by providing a first disconnecting cut of a line connecting the normal transistor and the data signal line along a line substantially parallel with the data signal line, wherein such a first disconnecting cut can be provided so as to be separated from any gate line edges of a gate line of the liquid crystal display device, wherein the line connecting the normal transistor and the data signal line is located within an area between the gate line edges of the gate line, and further wherein the liquid crystal display device is configured so that the normal transistor can be disconnected from the pixel electrode by providing a second disconnecting cut along a line that is substantially parallel with the gate line of the normal transistor.

2. The liquid crystal display device of claim 1, wherein a leader line is disposed in the spare transistor.

3. The liquid crystal display device of claim 2, wherein the leader line is formed so as to project from a gate line.

4. The liquid crystal display device of claim 2, wherein the leader line is formed at an angle close to orthogonal to the direction of a gate line until the leader line projects from the gate line and then bends in the direction of the data signal line after the leader line projects.

5. The liquid crystal display device of claim 2, wherein a cutout portion is disposed in a gate line such that the leader line does not planarly intersect the gate line.

6. The liquid crystal display device of claim 5, wherein the cutout portion is disposed between the normal transistor and the spare transistor.

7. The liquid crystal display device of claim 2, wherein the leader line is formed such that it does not planarly intersect the pixel electrode.

8. The liquid crystal display device of claim 2, wherein the leader line is formed such that it does not planarly intersect a holding capacity line.

9. The liquid crystal display device of claim 8, wherein the holding capacity line is bypassingly formed such that it does not planarly intersect the leader line, or a cutout portion is disposed in the portion of the holding capacity line that planarly intersects the leader line.

10. The liquid crystal display device of claim 2, wherein the leader line is formed such that it planarly intersects the pixel electrode.

11. The liquid crystal display device of claim 10, wherein a cutout portion is disposed in the planarly intersecting portion of the pixel electrode.

12. The liquid crystal display device of claim 2, wherein part of the leader line is formed to be wider than another part of the leader line.

13. The liquid crystal display device of claim 2, wherein a through hole is formed in at least one place on the leader line and on the data signal line.

14. The liquid crystal display device of claim 1, wherein two leader lines are disposed in the spare transistor, and an angle formed by lines connecting the centers of the distal ends of the two leader lines and a channel of the spare transistor is 45° or greater.

15. The liquid crystal display device of claim 1, wherein the line width of part of the portion of the data signal line that does not intersect a gate line formed to be wider than another part of the data signal line.

16. The liquid crystal display device of claim 1, wherein the size of the spare transistor is smaller than that of the normal transistor.

17. The liquid crystal display device of claim 1, wherein the size of the spare transistor is made smaller than that of the normal transistor, and a spacer is disposed in the pixel portion.

18. The liquid crystal display device of claim 1, wherein the spare transistor is disposed in different positions between pixel portions disposed with a spacer and pixel portions other than those.

19. The liquid crystal display device of claim 1, wherein the spare transistor is disposed just in pixel portions where a spacer is not disposed.

* * * * *